SYSTEM FOR THE GENERATION OF ELECTRIC PULSES

Filed Jan. 17, 1952 4 Sheets-Sheet 1

Inventor
H.H.ADELAAR
By Robert Harding Jr.
Attorney

Sept. 21, 1954 H. H. ADELAAR 2,689,910

SYSTEM FOR THE GENERATION OF ELECTRIC PULSES

Filed Jan. 17, 1952 4 Sheets-Sheet 2

Inventor
H.H. ADELAAR
By Robert Harding Jr.
Attorney

Inventor
H.H.ADELAAR
By Robert Harding Jr.
Attorney

Sept. 21, 1954 H. H. ADELAAR 2,689,910

SYSTEM FOR THE GENERATION OF ELECTRIC PULSES

Filed Jan. 17, 1952 4 Sheets-Sheet 4

Inventor
H.H.ADELAAR
By Robert Harding Jr.
Attorney

Patented Sept. 21, 1954 2,689,910

UNITED STATES PATENT OFFICE 2,689,910

SYSTEM FOR THE GENERATION OF ELECTRIC PULSES

Hans Helmut Adelaar, Antwerp, Belgium, assignor to International Standard Electric Corporation, New York, N. Y., a corporation of Delaware Application January 17, 1952, Serial No. 266,859

Claims priority, application Netherlands February 21, 1951

3 Claims. (Cl. 250—27)

The invention relates to a system for the generation of electric pulses such as described in our co-pending Belgian Patent No. 495,742 (M. Den Hertog—H. Adelaar—S. Simon—H. Ffissel—C. Hannigsberg 75-11-5-6-1), filed on May 16, 1950.

The object of the invention is the provision of a simple pulse generator or regenerator having an improved characteristic and more particularly as little dependence as possible on the shape of an input pulse applied to said pulse generator or regenerator.

A feature of the invention relates to a pulse generator or regenerator system in which an input pulse causes the generation of an output pulse, the trailing edge of the input pulse being converted into a trigger pulse which starts the generation of an output pulse.

Figure 1:
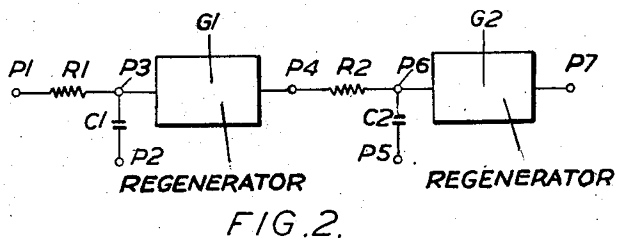
Figure 2:
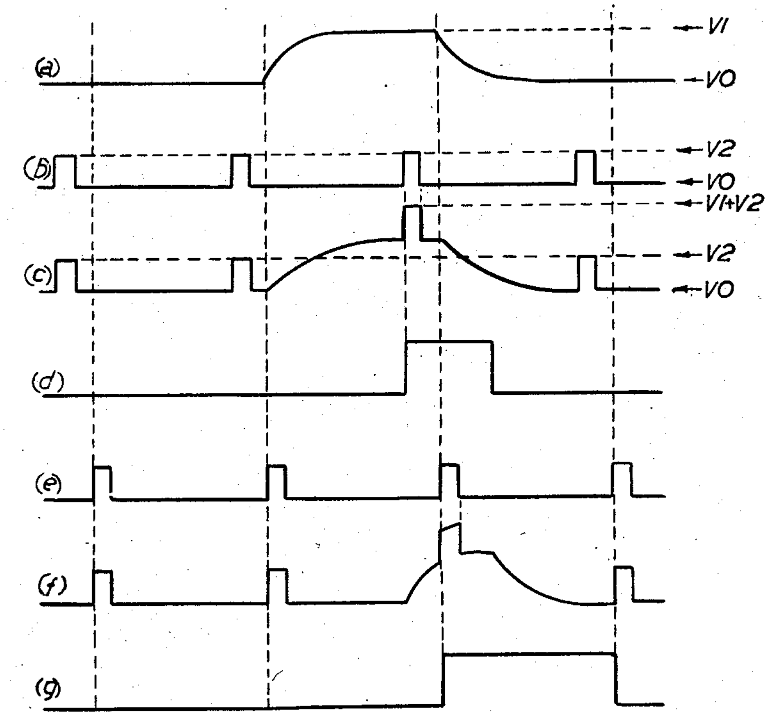
Figure 3:
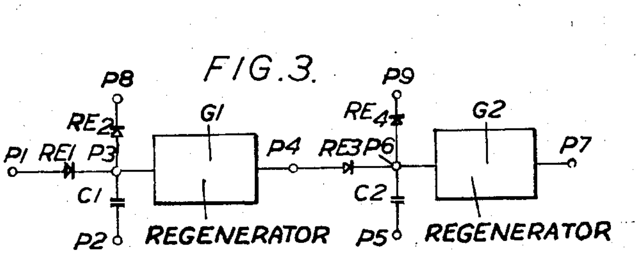
Figure 4:
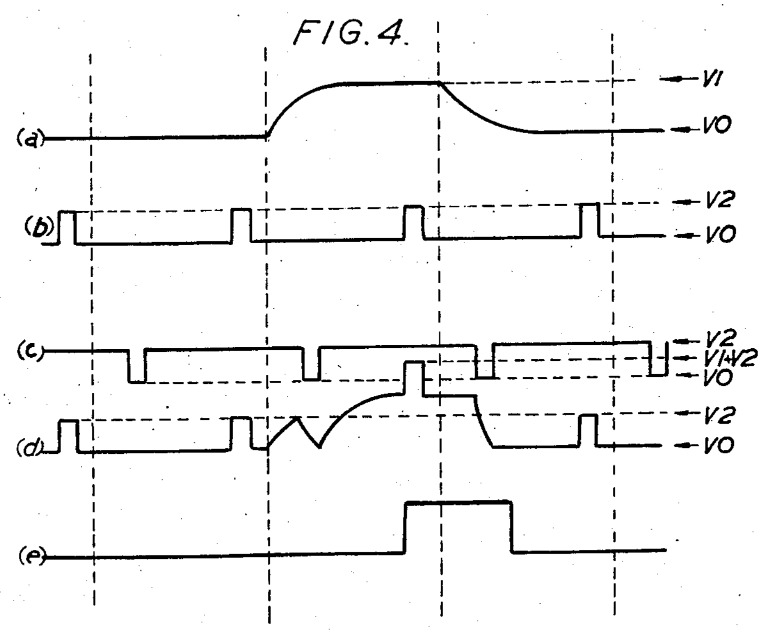
Figure 5:
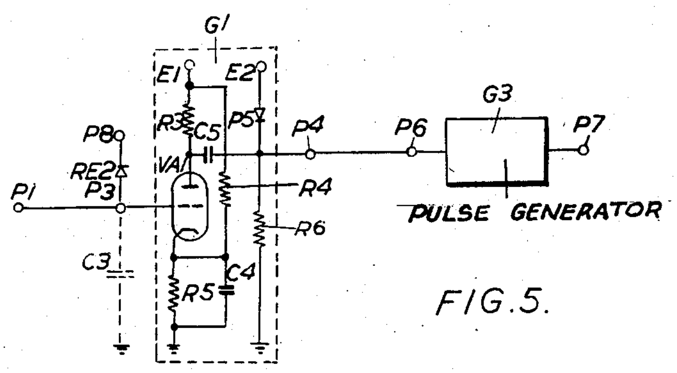
Figure 6:
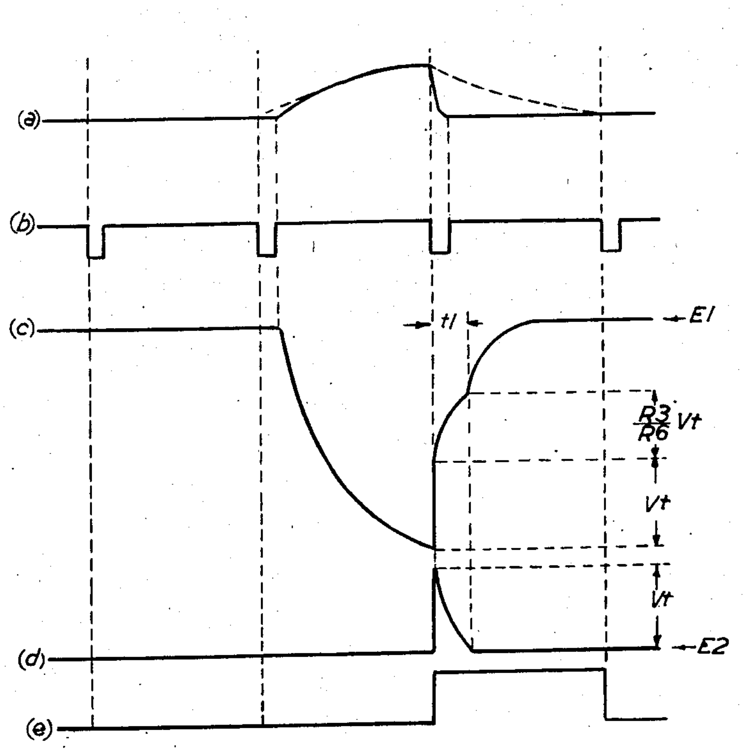
Figure 7:
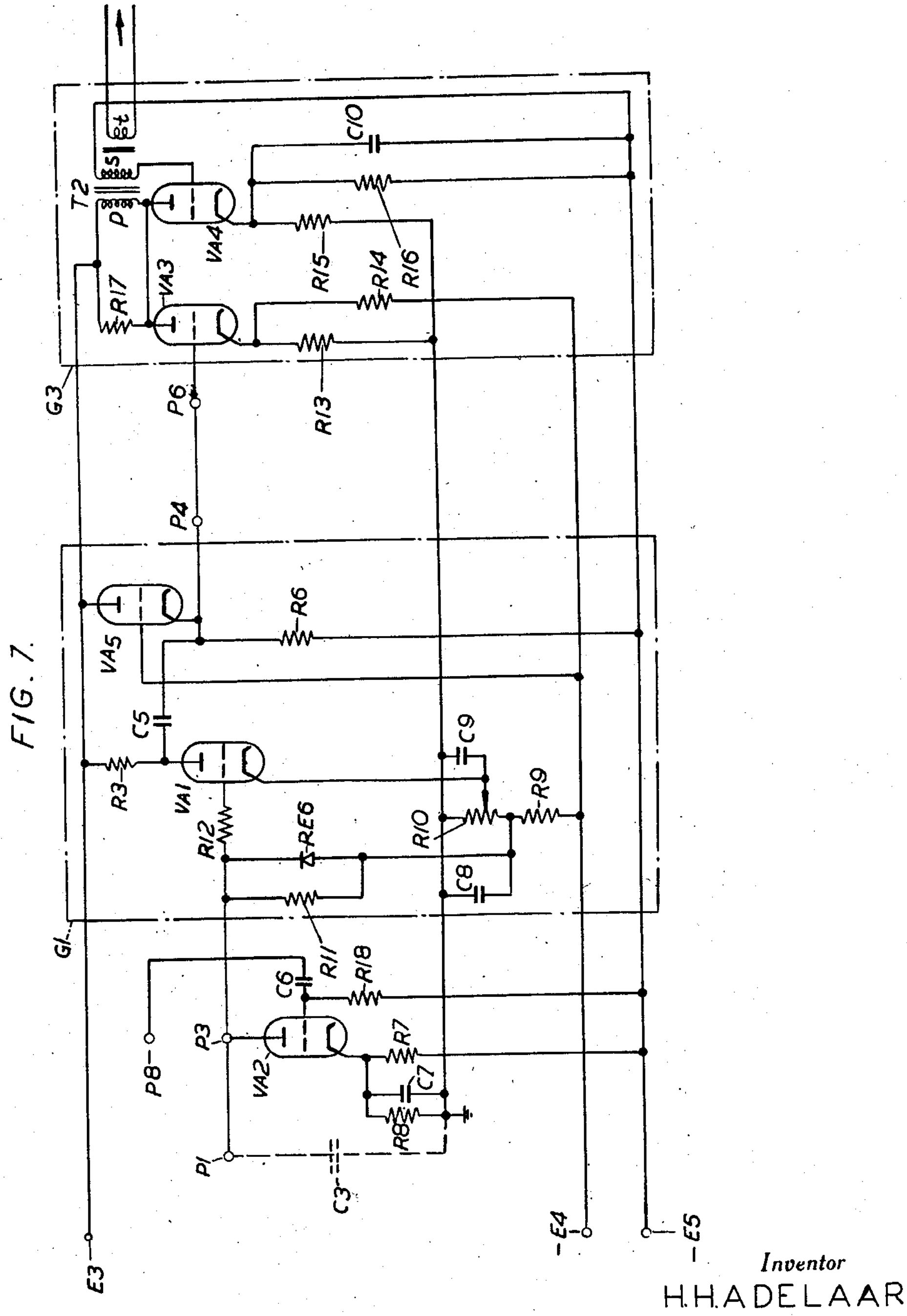

The above mentioned and other objects and features of the invention will become more apparent and the invention itself will be best understood by referring to the following description of the embodiments taken in conjunction with the accompaying drawings which represent:

Fig. 1, two stages of a known regenerator arrangement in which the input signal is applied via a resistor;

Fig. 2, pulse wave forms for the circuit of Fig. 1;

Fig. 3, two stages of a known regenerator system in which the input pulse is applied via a rectifier;

Fig. 4, pulse wave forms for the circuit of Fig. 3;

Fig. 5, an embodiment of a regenerator system in accordance with the invention;

Fig. 6, pulse wave forms for the circuit of Fig. 5;

Fig. 7, a more detailed embodiment of a regenerator system in accordance with the invention.

The relevant pulse wave forms of Figs. 2, 4 and 6 are shown in their time relationship. The time axis has been divided by vertical dotted lines into equal time intervals representing the basic time units of the system.

The invention will be described in relation to electric pulse regenerator circuits of the kind used in pulse communication exchange systems and particularly in systems using time division arrangements. In these systems, recurrent pulses are used to carry information, e. g. numerical information, by means of the time position at which they occur within a recurrent cycle. The recurrent cycle is divided into a number "*n*" of equal basic time intervals providing therefore for the transmission of "*n*" different digits, numbers, letters or other signals.

In such systems extensive use is made of pulse regenerators, which on receipt of a pulse create a new pulse, the shape and duration of the regenerated pulse being independent of the shape and duration of the received pulse. This is necessary due to the fact that the shape of the pulses may be substantially altered when passing through the various transmission circuits.

In order to be able to compare the regenerated pulses with pulses of the original pulse cycle supplied to the system by a master pulse generator, the regenerated pulses must have a definite time relationship with the pulses of the original pulse cycle. To achieve this, arrangements are already known in which the pulse regenerator will be triggered by a start pip of very short duration, e. g. one tenth of the basic time interval, which is supplied by the master pulse generator. These pips are supplied regularly at a definite position within a basic time interval, but the pulse regenerator is so designed that these pips remain without effect unless they coincide with the arrival of a pulse to be regenerated. In this way, it has been possible to fix the leading edge of the regenerated pulse with respect to the beginning and the end of the basic time intervals, whereas the duration of the pulse depends only on the circuit constants and supply voltages of the regenerator circuit. Such arrangements have been disclosed in the Belgian Patent No. 495,742 (M. Den Hertog et al. 75-11-5-6-1).

Further, since it is desirable that the regenerated pulse should have a location within the basic time interval which is identical to that of the original pulse, it will be necessary to use two or more pulse regenerators of the kind described above in cascade. In this manner, it will be possible, for example, to locate the regenerated pulse in the basic time interval immediately following that in which the original pulse is located.

Referring to Fig. 1, the latter shows a known arrangement of the type described above in which the incoming pulse to be regenerated is applied at terminal $P_1$ whereas a start pip will be applied at terminal $P_2$. In this manner the incoming pulses will be able to charge a condenser $C_1$ connected between terminals $P_2$ and $P_3$, the latter being connected to terminal $P_1$ via the charging resistance $R_1$. Terminal $P_3$ is the input terminal of a regenerator circuit $G_1$, the input of which is so biassed that it will remain inoperative when the incoming pulse or the start pip, respectively applied to terminals $P_1$ and $P_2$, do not coincide.

When the start pip coincides with the incoming pulse, the resulting charge of the condenser $C_1$ will be added to the voltage of the start pip and the total voltage appearing at terminal $P_3$ will then be sufficient to trigger the pulse regenerator circuit $G_1$.

Referring to Fig. 2, which shows the relevant pulse wave forms for the circuit of Fig. 1, (a) represents the shape of the incoming pulse which can be seen to be appreciably distorted. (b) shows the start pips which are applied at regular intervals near the end of each basic time interval. Potentials $V_1$ or $V_2$, which are respectively those of the incoming pulse and of the starting pip, are insufficient to overcome the bias of the pulse regenerator $G_1$, and accordingly unless the start pip coincides with an incoming pulse, this regenerator will not be actuated. When both pulses coincide, the resulting potential at terminal $P_3$ will be equal to $V_1+V_2$, as shown by (c). This voltage will be sufficient to trigger the regenerator $G_1$ and the latter will deliver an output pulse which is shown by (d).

It is to be remarked, however, that in order to obtain the necessary discrimination between non-coincident pulses and coincident ones, the pulse regenerator bias must be maintained within relatively narrow limits. Also, by referring to Fig. 2 (c), it will be seen that the input pulse fed at terminal $P_1$, (a), has been further distorted when reaching terminal $P_3$, (c), due to the time constant $C_1R_1$. This last point might become a very serious drawback, especially if the incoming pulse is already very much distorted, since the pulse regenerator $G_1$ will have difficulty in discriminating between a start pip of potential $V_2$ coinciding with an incoming pulse having a potential less than $V_1$ due to distortion and a start pip of potential $V_2$ which does not coincide with an incoming pulse, but which might, however, be superposed on the trailing edge of a preceding input pulse. In fact, if the incoming signal while being passed through the various transmission circuits, has already been distorted beyond the marginal limits for the pulse regenerator $G_1$, the arrangement would no longer operate satisfactorily.

Further, owing to the fact that the regenerated pulse shown at (d), Fig. 2, should preferably have the same location within the basic time interval as that of the original pulse, it will be necessary to pass the output pulse delivered at terminal $P_4$ through a second stage of regeneration. This is also shown in Fig. 1, and includes a second pulse regenerator $G_2$, similar to the pulse regenerator $G_1$, its input terminal $P_6$ being connected to the output terminal $P_4$ of the regenerator $G_1$ via resistor $R_2$. A second series of start pips shown in Fig. 2 (e) will be applied to terminal $P_5$ which is connected to terminal $P_6$ via condenser $C_2$. Again, the output pulse delivered at terminal $P_4$ will be subjected to distortion due to the time constant $C_2R_2$ and accordingly marginal conditions will also exist for the second stage of regeneration. The start pips which are fed at terminal $P_5$ occur at the beginning of every basic time interval and in this manner, as shown in Fig. 2 (f, g) a final regenerated output pulse will be delivered at output terminal $P_7$ (g) and will be located in the basic time interval immediately following that of the incoming pulse applied at terminal $P_1$.

To avoid the drawback of time constants $C_1R_1$ and $C_2R_2$, the circuit of Fig. 1 might be modified as shown in Fig. 3. This figure shows that the incoming pulse applied at terminal $P_1$, reaches terminal $P_3$ via a rectifier $RE_1$ which offers a very low resistance to the charging of condenser $C_1$. Accordingly, no additional distortion of the incoming pulse will occur. With this arrangement, it is, of course, necessary to use an auxiliary discharge path for the condenser $C_1$ after the pulse regenerator $G_1$ has been triggered. This is achieved by means of an additional negative pip which is applied at terminal $P_8$ via rectifier $RE_2$.

The relevant wave forms for the circuit of Fig. 3 are shown in Fig. 4. In Fig. 4, (a) and (b) correspond to the wave forms shown at (a) and (b) in Fig. 2 and (c) represents the negative pips which are used to discharge condenser $C_1$. In this manner, as shown by (d), the negative pip will break into the ascending part of the incoming pulse but this disadvantage is, however, compensated for by the fact that the incoming pulse suffers no additional distortion in the charging circuit $C_1(RE_1)$. An output pulse will be produced at terminal $P_4$, as shown by (e).

With this arrangement it is still impossible to use only a single stage of regeneration and accordingly the output pulse delivered at terminal $P_4$ will be fed into a second stage of regeneration which, as shown in Fig. 3, is identical to the first stage. For this second stage of regeneration, the start pips will, of course, occur at the beginning of a basic time interval, in the same manner, as shown in Fig. 2 (e).

However, the most serious disadvantage of the arrangement shown in Fig. 3 is due to the fact that high frequency interference picked up on the transmission line leading to the input terminal $P_1$ will be detected by the rectifier $RE_1$ and if it is of sufficient strength, it might trigger the pulse regenerator. An embodiment of the invention is shown in Fig. 5, and the essential feature of this circuit resides in the fact that the start pip is used subtractively instead of additively with the known arrangements shown in Figs. 1 and 3. In a sense, this negative start pip corresponds to the negative discharge pips which are used in conjunction with the circuit shown in Fig. 3 in order to discharge the condenser $C_1$. However, in the case of the circuit of Fig. 5, the negative start pips can now be located at the beginning of the basic time interval.

The circuit of Fig. 5 shows that the input rectifier $RE_1$ has been dispensed with and the input terminal $P_1$ is directly connected to terminal $P_3$ to which rectifier $RE_2$ is connected, said rectifier being also connected to terminal $P_8$ to which the negative start pips are fed from a low impedance source at the beginning of each time unit interval. The circuit of Fig. 5 no longer necessitates the use of a condenser such as $C_1$ (Fig. 3) but there will remain, of course, a parasitic capacity to ground which has been indicated by $C_3$ on Fig. 5. Terminal $P_3$ leads to the input of a pulse regenerator circuit $G_1$ which has been shown in detail. It comprises a vacuum tube $VA_1$ the plate of which is connected to a source of positive D. C. potential $E_1$ via a plate resistor $R_3$. Its control grid is connected to terminal $P_3$, while the grid-cathode circuit of the tube is provided with a negative bias by means of the potentiometer arrangement including resistors $R_4$ and $R_5$, the latter being by-passed by condenser $C_4$. The anode of tube $VA_1$ is connected to the output terminal $P_4$ of the regenerator $G_1$ by means of a condenser $C_5$ which forms an essential part of the circuit. Terminal $P_4$ is also connected to an auxiliary source of positive D. C. potential $E_2$ via a rectifier $RE_5$. The same terminal is further connected to ground via resistor $R_6$.

Referring to Fig. 6, which shows the various pulse wave forms for the circuit of Fig. 5, (*a*) shows the incoming pulse in dotted lines, while (*b*) shows the negative start pips which are periodically applied at the beginning of each time unit interval, to terminal $P_8$. It will be noted that the shape of the incoming pulse has been shown to have been appreciably distorted during transmission to the input terminal $P_1$, in order to emphasize that the circuit of Fig. 5 will not be limited by such an amount of distortion. The negative start pips will cause a slight delay for the voltage appearing at terminal $P_3$ and this voltage has been shown at (*a*) by a full line. The negative start pip which immediately follows the start pip which caused said slight delay, will produce a rapid discharge of the parasitic capacity $C_3$ and this has also been indicated by a full line at (*a*).

The potentials which will appear at the anode of tube $VA_1$ and at the output terminal $P_4$ of the pulse regenerator $G_1$, will now be considered.

Fig. 6 (*c*) shows the potential at the anode of tube $VA_1$, while (*d*) shows the potential at the output terminal $P_4$. Before an incoming pulse is applied at terminal $P_1$, and as tube $VA_1$ is not conductive, the potential at the anode of tube $VA_1$ is equal to $E_1$, while the potential at the output terminal $P_4$ is equal to $E_2$, being clamped thereto by the rectifier $RE_5$. At this moment, the negative start pips will, of course, have no influence on these potentials.

As soon as an incoming pulse is applied at terminal $P_1$, the potential at the grid of tube $VA_1$ will assume the shape shown by the full line in (*a*) and the tube will become conductive. This will establish a discharge path for the condenser $C_5$ via the plate-cathode space of tube $VA_1$, condenser $C_4$ and rectifier $RE_5$ which by-passes resistor $R_6$. The discharge time constant will accordingly be small as indicated in Fig. 6 (*c*). At the end of the basic time interval in which the incoming pulse is located and as soon as the negative start pip is applied to terminal $P_8$, at the beginning of the next basic time interval, the parasitic capacity $C_3$ will be quickly discharged via rectifier $RE_2$ and the tube will again become non-conductive. At this moment, a circuit will suddenly be established from positive potential $E_1$ to ground via $R_3$, $C_5$ and $R_6$. This will produce a trigger pulse at the output terminal $P_4$, whose initial amplitude $V_t$ will be equal to $$\frac{R_6}{R_3+R_6}(E_1-E_c)$$

where $E_c$ is the voltage across condenser $C_5$. This is shown in Fig. 6 (*d*). Since the newly established current will decrease exponentially, this initial voltage will also decrease, until after a time $t_1$, determined by the time constant $C_5(R_3+R_6)$, the output potential at $P_4$ again reaches the value $E_2$ to which it remains clamped.

A similar sudden increase of potential will, of course, occur at the anode of tube $VA_1$ and this is shown in Fig. 6 (*c*). After a time $t_1$, the voltage at the anode will have increased exponentially by an amount $$\frac{R_3}{R_6}V_t$$

and at a rate determined by the time constant $C_5(R_3+R_6)$. As soon as the output potential at terminal $P_4$ is clamped to the value $E_2$, the rate of increase for the anode voltage will be abruptly modified and will now be determined by the shorter time constant $C_5R_3$, as indicated in Fig. 6(*c*), until the anode is restored to the potential $E_1$.

In this manner, a sharp output pulse of sufficient amplitude is suddenly obtained at the beginning of the basic time interval which follows that in which the incoming pulse is located, and, as shown by Fig. 5, this can be fed to the input terminal $P_6$ of a pulse generator $G_3$ which will deliver an output pulse at terminal $P_7$ which is shown by (*e*), Fig. 6. This output pulse will be located in the basic time interval following that of the incoming pulse, and accordingly only one stage of regeneration is necessary.

A more detailed embodiment of the invention is shown in Fig. 7, but the principle of operation for this last mentioned circuit is essentially the same as that of the basic circuit shown in Fig. 5.

In the circuit of Fig. 7, rectifier $RE_2$ shown in Fig. 5 has now been replaced by a vacuum tube $VA_2$, and in this manner, due to the phase reversal of 180° produced by this tube, positive start pips will have to be used, but their function will remain the same as that of the negative start pips shown in Fig. 6 (*b*). The anode of tube $VA_2$ is connected to the input terminal $P_3$ of the pulse regenerator $G_1$, while its grid is connected to terminal $P_8$ to which the positive start pips are fed, via a coupling condenser $C_6$. This grid is further connected to a negative D. C. potential $-E_5$, via resistance $R_{18}$, while the cathode of tube $VA_2$ is biassed by means of the potentiometer arrangement $R_7$, $R_8$, the latter resistance being by-passed by condenser $C_7$. The ends of the potentiometer arrangement are respectively at $-E_5$ and ground potential. The anode of tube $VA_2$ is positively biassed with respect to its cathode by means of a voltage somewhat less than $-E_4$ which is derived from the potentiometer arrangement $R_9$, $R_{10}$, the latter resistance being by-passed to ground by means of condenser $C_8$. This voltage is, in fact, supplied through a voltage limiter arrangement $R_{11}$, $RE_6$ which prevents the anode potential of tube $VA_2$ from decreasing below $$\frac{-E_4R_{10}}{R_9+R_{10}}$$

The input terminal $P_3$ of the pulse regenerator $G_1$ leads to the vacuum tube $VA_1$, similar to that shown in Fig. 5, via the grid resistor $R_{12}$, but this time, the cathode bias for tube $VA_1$ is obtained from a tapping on resistor $R_{10}$, by-pass condenser $C_9$ being used. It should be noted that the supply voltages previously mentioned are reckoned positive or negative with respect to ground potential.

The rectifier $RE_5$, shown in Fig. 5, and which was used to clamp the potential of terminal $P_4$ to $E_2$, has also been replaced by a vacuum tube ($VA_5$) the grid of which is biassed to $-E_4$ while the cathode is biassed via resistor $R_6$ whose other end is at potential $-E_5$. The anode of tube $VA_5$ is connected to positive potential $E_3$.

In this way, it will be appreciated that the pulse regenerator $G_1$ shown in Fig. 7 will function in the same manner as that shown in Fig. 5. When there are no incoming pulses at terminal $P_1$, condenser $C_5$ is charged and the anode potential of tube $VA_1$ is equal to $E_3$.

Tube $VA_5$, which is connected as a cathode follower, maintains a voltage at its cathode which is slightly higher than the grid potential, therefore about equal to $-E_4$. A steady current of about $$\frac{-E_4+E_5}{R_6}$$

flows from the $E_3$ terminal through tube $VA_5$ and resistance $R_6$ to the $-E_5$ terminal. It will be seen that the current drawn from the cathode of tube $VA_5$ may be increased without appreciably altering the cathode potential.

It may therefore be said that valve $VA_5$ limits the voltage of the right hand electrode of condenser $C_5$ at a $-E_4$ minimum. If, however, a current of sufficient intensity is sent through condenser $C_5$ towards resistor $R_6$, the current through $VA_5$ is reduced to zero and the cathode potential rises above $-E_4$.

If an input impulse arrives at the grid of tube $VA_1$, this tube which is normally cut off will become conductive. Its anode voltage therefore decreases and tends to decrease the potential at the cathode of valve $VA_5$. This however is prevented by the limiting action of $VA_5$. A discharge current therefore develops from $+E_3$ terminal, through valve $VA_5$, condenser $C_5$, valve $VA_1$, condenser $C_9$ to ground, and condenser $C_5$ is discharged without appreciable delay. At the end of the input pulse, tube $VA_1$ is rapidly cut off, and condenser $C_5$ now starts to charge through resistors $R_3$ and $R_6$. The circuit constants are so chosen that the voltage drop of the charging current across resistor $R_6$ substantially exceeds the voltage between sources $-E_4$ and $-E_5$, and tube $VA_5$ is cut off. As however the charge of $C_5$ increases, the current decreases and the potential at the cathode of $VA_5$ tends exponentially towards $-E_5$ at a rate determined by the time constant $C_5(R_3+R_6)$. After a short time the cathode potential of $VA_5$ has decreased sufficiently for this valve to become conductive again, and the cathode potential is again clamped to the $-E_4$ source. The charging of condenser $C_5$ now continues at a rate determined by the shorter time constant $C_5R_3$, until $C_5$ is again fully charged, and the original conditions are restored.

It will appear from the foregoing and from Fig. 6 (*d*) that during the first part of the process described above, a triangular (trigger) voltage pulse appears at the cathode of $VA_5$. This pulse is used to trigger the pulse regenerator shown inside box $G_3$. Though this may be a monostable generator of any suitable type, a circuit of the biassed blocking oscillator type has been shown, comprising a first valve $VA_3$, serving as separator-amplifier, and a second valve $VA_4$ having its grid circuit coupled to its anode circuit by means of transformer *Tr*. Both tubes are normally biassed beyond cut off, viz. $VA_3$ by means of voltage divider $R_{13}$—$R_{14}$, and tube $VA_4$ by voltage divider $R_{15}$—$R_{16}$. The latter is preferably decoupled by a large condenser $C_{10}$, while the former may or may not be thus decoupled.

The operation is as follows:

If a positive trigger pulse of sufficient amplitude is applied to the grid of valve $VA_3$, this valve becomes conductive; a negative pulse arises across the anode resistance $R_{17}$ and across the primary winding of transformer *Tr*. The secondary winding is connected in such a way that the pulse induced in the secondary winding causes the grid of $VA_4$ to become less negative. If the pulse is of sufficient amplitude, tube $VA_4$ starts to conduct, and this further decreases the anode potential of $VA_4$. An initial incremental increase of grid potential is amplified and fed back positively to the same grid. This means that regeneration takes place. The anode voltage continues to decrease rapidly, whereas the grid voltage increases at the same rate until, with very low plate voltage, the amplification factor of the tube decreases below zero.

At this moment a new equilibrium is reached, with almost constant plate and grid voltage, plate current decreasing and grid current decreasing even more rapidly. This equilibrium is maintained until grid current approaches zero. At that moment a small decrease of grid voltage causes the plate current to decrease, the plate voltage to increase, so that a further decrease of the grid voltage is caused.

Regeneration takes place again, rapidly driving the valve beyond cut off. Due to the magnetic energy stored in the core of the transformer, a positive peak arises across the transformer primary. This peak causes the current to reverse in resistor $R_{17}$, and rapidly dies down as the energy is dissipated in said resistor.

A positive output pulse may be taken off the transformer secondary or from a separate tertiary winding on the transformer.

The time during which the unstable equilibrium condition is present largely depends on the self inductance of the transformer, on the effective resistance in series and in parallel with the transformer windings, on the tube characteristics, and on the supply voltages. By a suitable choice of these parameters it is possible to obtain an output pulse of my desired length. The shape of the output pulse may be improved, e. g. by the use of rectifiers or other limiter means (not shown) to clip off the peak of reversed voltage at the end of the pulse. In this way an output pulse of substantially rectangular wave form may be obtained, as shown in Fig. 6*e*.

This invention has been described with reference to specific embodiments; it must however be understood that other arrangements are possible. Instead of the tubes shown in Figs. 5 and 7 other electronic devices might be used, such as tubes having four or more electrodes, or transistors. Also, valve $VA_1$ might be replaced by a pentode, and the auxiliary pulse might be applied with negative polarity to the suppressor grid of this pentode.

While the principles of the invention have been described above in connection with specific apparatus, it is to be clearly understood that this description is made only by way of example and not as a limitation on the scope of the invention.

What is claimed:

1. An electric pulse generating system in which the generation of an output pulse depends on the receipt of an input pulse coincident with a control pulse comprising means for simultaneously receiving an input pulse and a control pulse, energy charging means connected to said pulse receiving means for creating a trigger pulse, said energy charging means being responsive to the leading edge of the next received control pulse, and means connected to said last-mentioned means and responsive to said trigger pulse for generating an output pulse, the means for creating a trigger pulse comprising a capacitive device, a high impedance charging circuit for said device, a low impedance discharging circuit for said device, means for electronically controlling said discharging circuit by the input pulse and the control pulse to establish said circuit during the ascending flank of said input pulse and to interrupt said circuit during the trailing flank of said input pulse in response to the receipt of the next control pulse, and means for utilizing the voltage drop produced by the charging current across part of said charging circuit for creating the trigger pulse.

2. An electric pulse generating system, as defined in claim 1, further comprising a source of D. C. potential, a first resistance, means for connecting one end of the capacitive device to the positive terminal of said source via said first resistance, a second resistance, means for connecting the other end of said device to the negative terminal of said source via said second resistance, a uni-directional voltage limiting means connected to the junction point of said second resistance and said capacitive device to limit the voltage thereat in one sense, and electronic control means connected to the junction point of said first resistance and said capacitance device to establish and interrupt the low impedance discharge circuit under control of the control pulse.

3. An electric pulse generating system, as defined in claim 2, in which the discharge circuit comprises a vacuum tube the anode of which is connected to the junction point of the condenser and the first resistor, the means for receiving the input pulse is connected to the control grid so that said input pulse will raise the grid-cathode bias which is normally beyond cut-off and cause said tube to pass current, and the means for receiving the control pulse is also connected to said control grid, whereby said control pulse restores the original bias so that the flow of current through said tube is interrupted.

References Cited in the file of this patent

UNITED STATES PATENTS

| Number | Name | Date |
| --- | --- | --- |
| 2,265,290 | Knick | Dec. 9, 1941 |
| 2,390,608 | Miller et al. | Dec. 11, 1945 |
| 2,402,916 | Schroeder | June 25, 1946 |
| 2,536,816 | Krumhansl et al. | Jan. 2, 1951 |